United States Patent [19]

Kisslig

[11] Patent Number: 5,501,437
[45] Date of Patent: Mar. 26, 1996

[54] ADAPTER FOR USE WITH CLAMPING DEVICES ON MULTI-HOLE-MACHINE-TOOL WORKPIECE TABLES

[76] Inventor: Heinz Kisslig, Hauptstrasse 83, CH-8552 Felben-Wellhausen, Switzerland

[21] Appl. No.: 199,256

[22] PCT Filed: Jul. 5, 1993

[86] PCT No.: PCT/CH93/00172

§ 371 Date: Mar. 4, 1994

§ 102(e) Date: Mar. 4, 1994

[87] PCT Pub. No.: WO94/01242

PCT Pub. Date: Jan. 20, 1994

[30] Foreign Application Priority Data

Jul. 6, 1992 [CH] Switzerland ............... 2114/92

[51] Int. Cl.⁶ .................................................. B23Q 3/06
[52] U.S. Cl. .................................. 269/99; 269/900
[58] Field of Search ................... 269/91–94, 99, 269/100, 88, 900, 45, 71, 303, 305, 309

[56] References Cited

U.S. PATENT DOCUMENTS

| | | |
|---|---|---|
| 1,397,771 | 11/1921 | Mort . |
| 2,365,079 | 8/1943 | Huber ................................. 269/93 |
| 4,711,437 | 12/1987 | Longenecker et al. ............. 269/900 |
| 5,026,033 | 6/1991 | Roxy . |
| 5,246,217 | 9/1993 | Brot .................................. 269/99 |

FOREIGN PATENT DOCUMENTS

| | | |
|---|---|---|
| 3232055 | 3/1984 | Germany . |
| 3407003 | 2/1985 | Germany . |
| 4004323 | 1/1991 | Germany . |
| 4031914 | 4/1992 | Germany . |

*Primary Examiner*—Robert C. Watson
*Attorney, Agent, or Firm*—Speckman, Pauley & Fejer

[57] ABSTRACT

An adapter for use with clamping devices for clamping workpieces on perforated screen plates of machine tools. The adapter has a plurality of building block-like elements. One such element, a base plate, has at least two bores for fastening the base plate to the perforated screen plate. A T-groove in the base plate receives a transverse sliding element. A T-groove in the transverse sliding element receives a base of a longitudinal sliding element. A building block element rests on the base plate. A securing mechanism secures the building block-like elements with respect to each other.

14 Claims, 4 Drawing Sheets

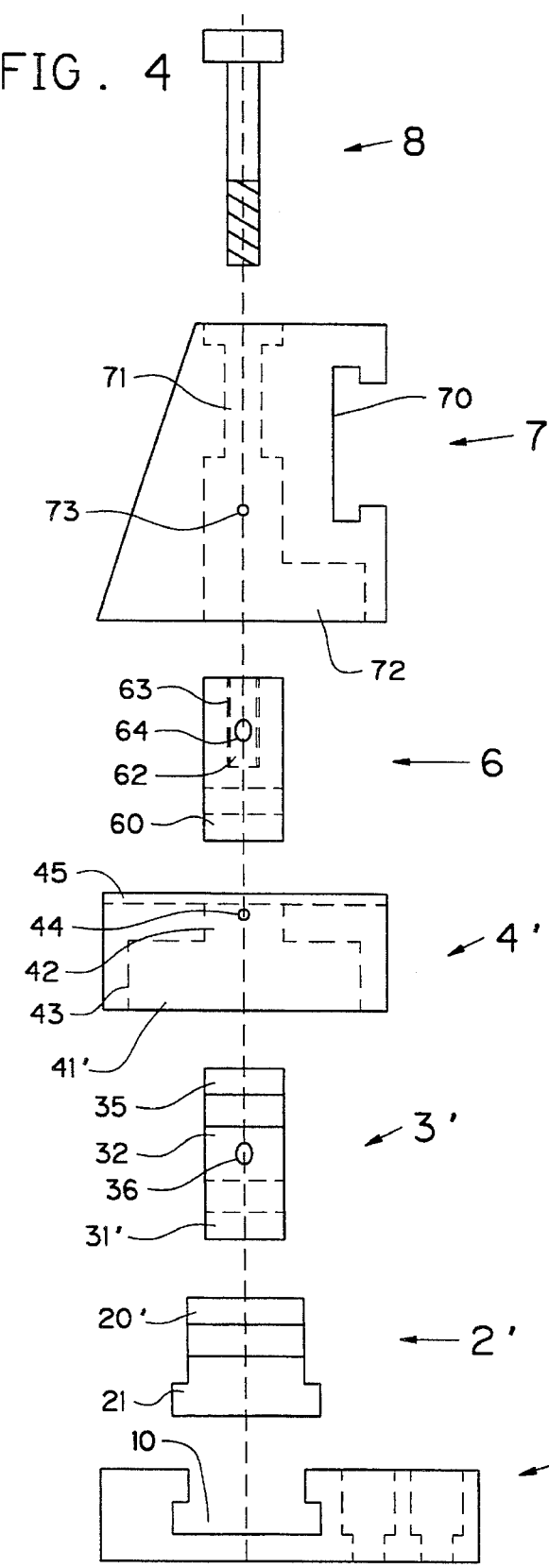
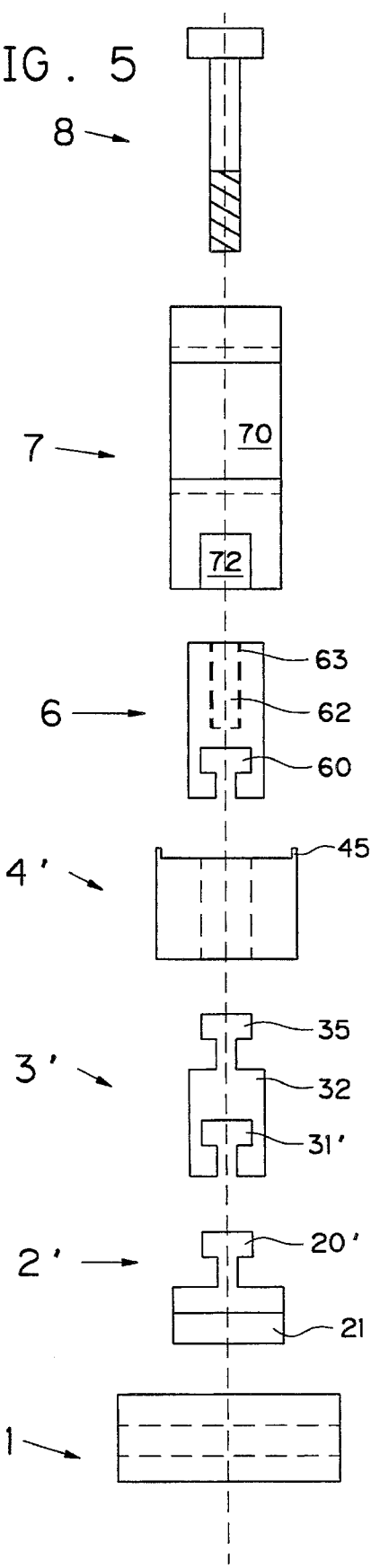

ADAPTER FOR USE WITH CLAMPING DEVICES ON MULTI-HOLE-MACHINE-TOOL WORKPIECE TABLES

BACKGROUND OF THE INVENTION

1. Field of the Invention

This invention relates to an adapter for use with clamping devices for clamping workpieces on perforated screen plates of machine tools.

2. Description of Prior Art

Machine tools, such as milling machines or drills, are often equipped with a clamping table for clamping workpieces. Previously, these tables mostly had T-grooves or dovetailed grooves, into which clamping screws or threaded bolts were inserted. The workpiece was fastened either by these threaded bolts or with other clamping elements, such as clamping straps and threaded clamps. This type of clamping table is increasingly being replaced by machine tables having a screen plate or a screen block. Both variants have threaded bores at defined distances in the perforated screen. Typical distances between holes of the perforated screen are 50 mm with an accuracy of a few micrometers. The workpiece can be fastened as before with the aid of clamping elements, which are mounted in the holes of the perforated screen with screws.

Situations occur where the position of the holes provided in the screen is unsatisfactory.

This is the case, for example, if it is necessary to clamp a workpiece in such a way that poor force transfer conditions are created. In such situations the lever arm between the clamping screw of the clamping element and the workpiece is larger than the lever arm of the clamping element on the opposite side of the clamping screw. Thus, the clamping force is transferred in an unfavorable manner to the workpiece. The workpiece is not securely clamped, and accuracy and the clamping force are reduced.

The locations of the screen holes provided often cause the clamping element to cover a portion of the workpiece surface to be treated. Thus, in these situations it is necessary to clamp the workpiece twice for treatment. This increases the amount of labor and therefore production costs and, in addition, greater production tolerances in the workpiece must be expected.

In both of the situation mentioned a threaded hole is needed exactly in a place where there is none, namely between two adjoining holes of the perforated screen plate.

SUMMARY OF THE INVENTION

It is an object of this invention to provide a device for clamping a workpiece regardless of the distribution of holes in the machine table, so that the above mentioned disadvantages are avoided.

To attain this according to one embodiment of this invention, an adapter is fastened on a perforated screen plate or perforated screen block. The clamping element is not mounted on the perforated screen plate or the perforated screen block, but to the adapter. It is now possible to fix the clamping element holding the workpiece in any position, regardless of the distribution of the holes in the machine table. The adapter of this invention allows complete freedom in choosing the position in which the workpiece is to be clamped in relation to the machine table and in relation to the workpiece itself. In this way it is possible to transfer an optimal clamping force to the workpiece. The workpiece can also be clamped in such a way that the surfaces to be treated are not covered by clamping elements. Thus it is not necessary to interrupt the work process to clamp the workpiece in a different position.

All these requirements are achieved, according to one embodiment of this invention, by an adapter for use with clamping devices for clamping workpieces on a perforated screen plate or a perforated screen block. The adapter has a plurality of building block-like elements. One such element, a base plate, has at least two bases separated by a distance equal to the distance between the screen holes of the perforated screen plate. The two bores are used for fastening the base plate to the perforated screen plate. The base plate forms a first T-groove at a lateral distance away from the two bores. The first T-groove receives a transverse sliding element. The transverse sliding element forms a second T-groove, which is perpendicular to the first T-groove, for receiving a base of a longitudinal sliding element. The base of the longitudinal sliding element has the shape of a T-nut. A building block element rests on the base plate. A securing mechanism secures the building block-like elements with respect to each other by interlocking the building block-like elements and clamping the building block-like elements together.

It is another object of this invention to provide a device for clamping workpieces in a simple manner and in a horizontal direction, regardless of the distribution of the holes in the machine table.

This is attained according to one embodiment of this invention, by a horizontal adapter element which allows for clamping of the workpiece in a horizontal direction and which can be fastened to the adapter. The horizontal adapter element forms a third T-groove which is perpendicular to the first T-groove of the base plate thereby allowing the workpiece to be clamped horizontally.

Several embodiments of this invention are illustrated in the drawings and will be explained in the subsequent description.

BRIEF DESCRIPTION OF THE DRAWINGS

FIG. 4 is an exploded side view of an adapter according to another preferred embodiment of this invention; and FIG. 5 is an exploded front view of the adapter shown in FIG. 4.

DESCRIPTION OF THE PREFERRED EMBODIMENTS

Figure 1:
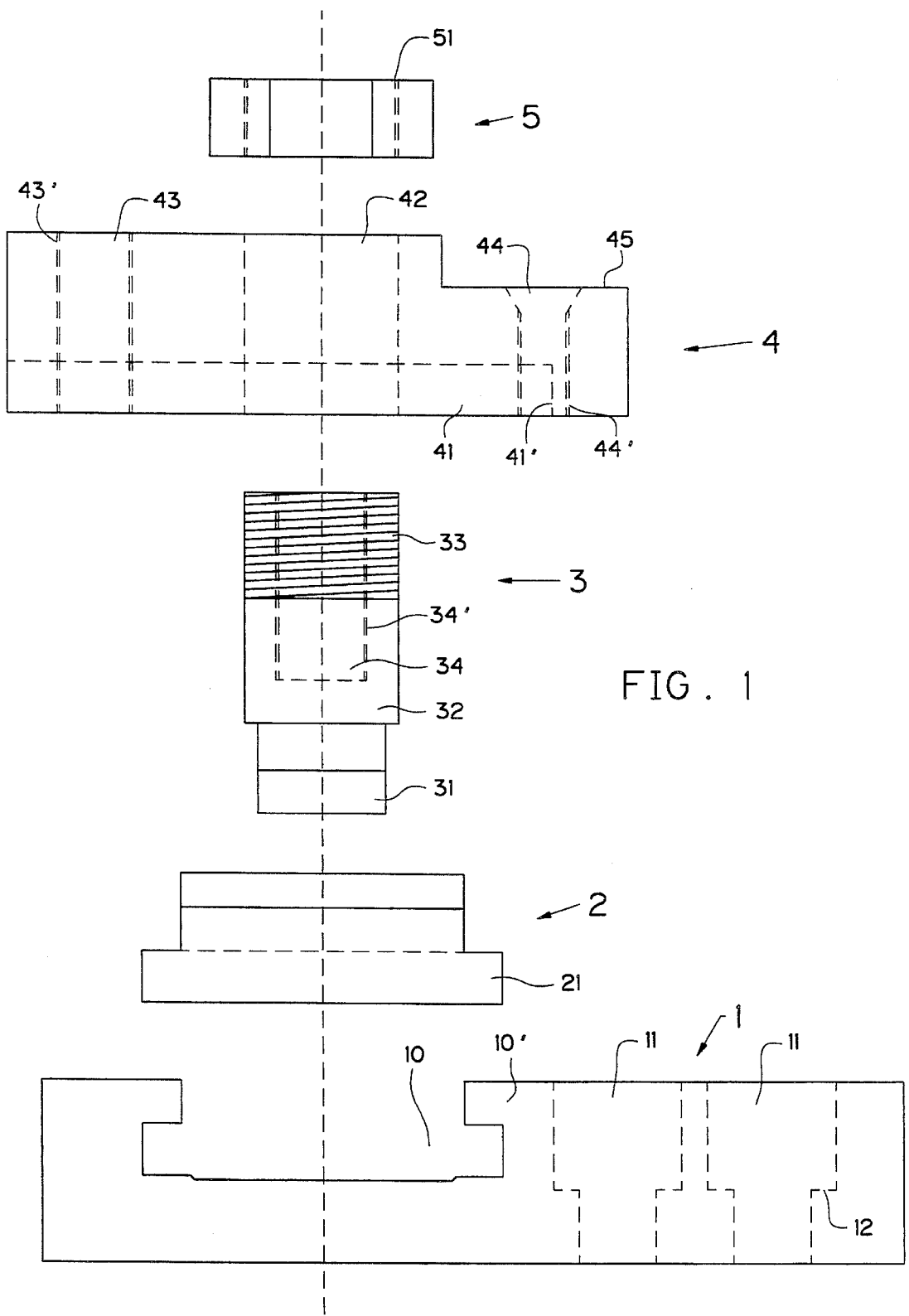
FIG. 1 is an exploded side view of the adapter for use with clamping devices on perforated screen plates, according to one preferred embodiment of this invention.
Figure 2:
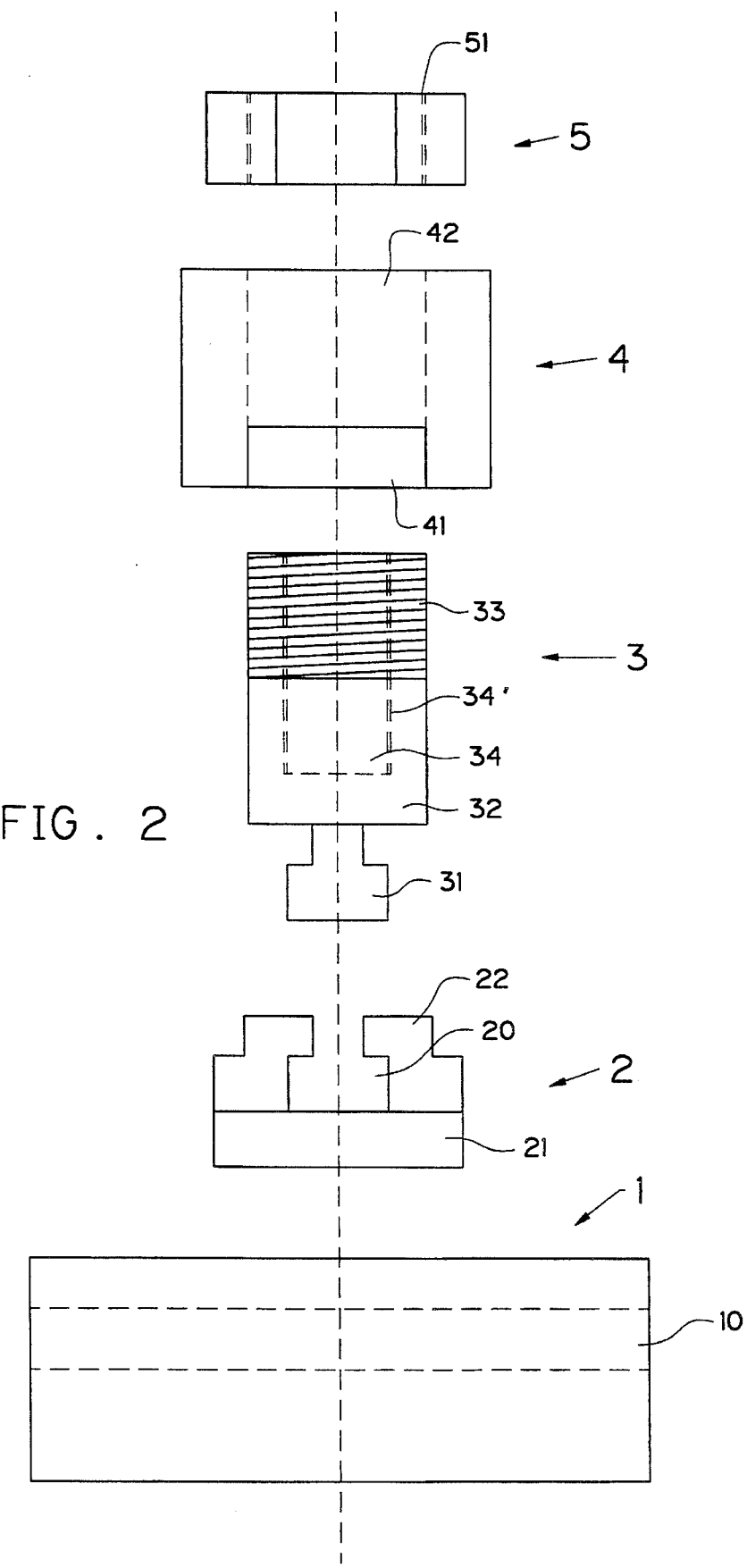
FIG. 2 is an exploded front view of the adapter shown in FIG. 1.
Figure 3:
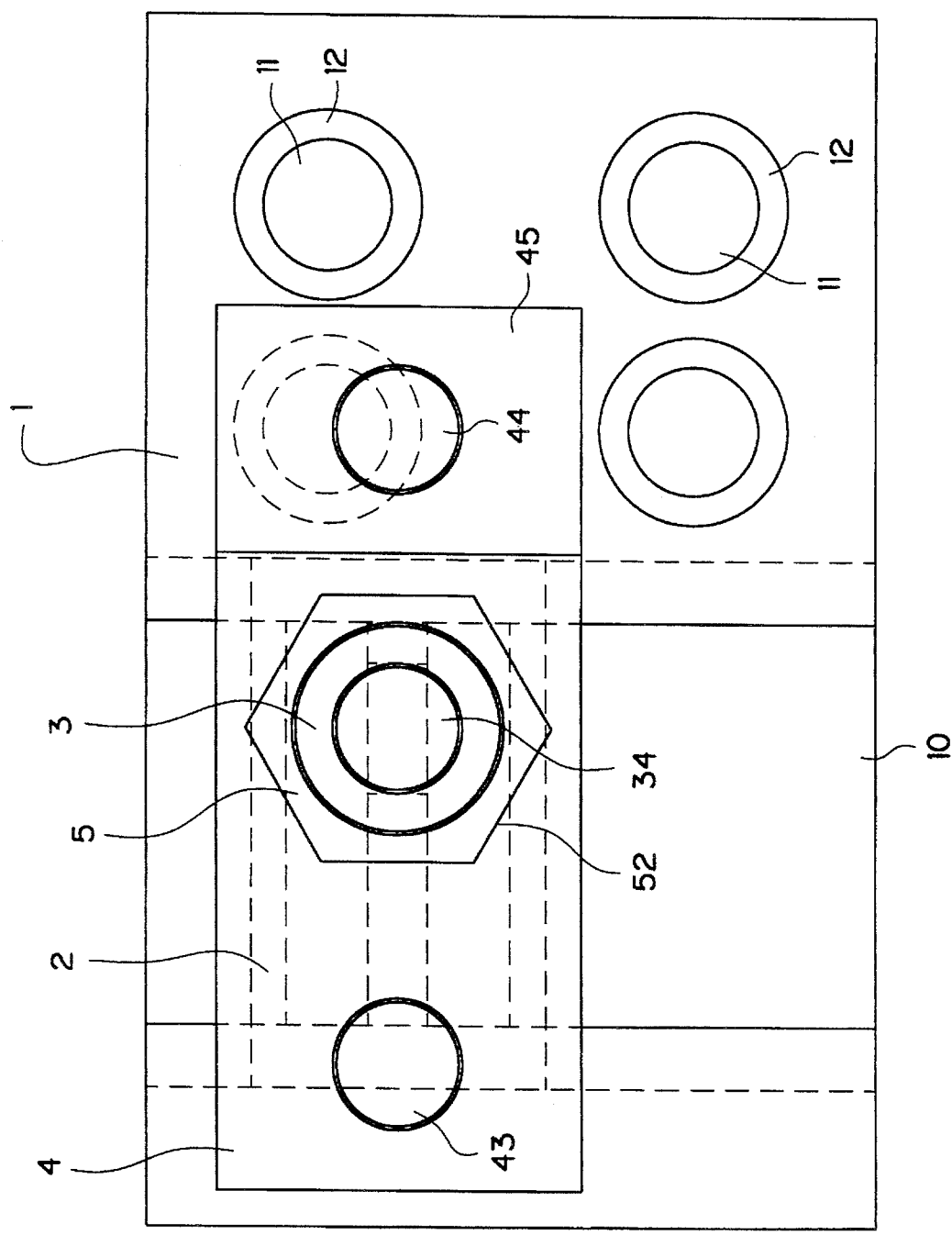
FIG. 3 is a top view of the adapter shown in FIGS. 1 and 2.

An adapter for use with clamping devices according to one preferred embodiment of this invention has several individual parts which can be assembled in a building block fashion. One embodiment of the adapter in accordance with this invention is illustrated in FIGS. 1–3. The basic element is a base plate 1 which has the shape of a flat parallelepiped. To keep its weight as low as possible, the base plate 1 is preferably produced from heavy anodized aluminum, however, other materials which are commonly used for this can also be considered. In one half of the base plate 1, the base plate 1 has at least four bores 11 having central longitudinal axes which define four corners of a rectangle on a top surface of the base plate 1. The longer side of the rectangle is parallel to the shorter edge of the top of the base plate 1 and corresponds to the distance between holes of the perforated screen plate or the screen block. The shorter side of the rectangle is parallel to the longer edge of the base plate 1, and is less than or equal to half of the distance between the holes of the perforated screen plate. The four bores 11 are through bores and have a shoulder 12 at approximately half their depth. The base plate 1 is fastened to the perforated screen plate or the perforated screen block, wherein two threaded bolts are positioned in two bores 11 of the base plate 1 which form the longer side of the above mentioned rectangle. The threaded bolts rest on the shoulder 12 and are screwed into the threaded bores of the screen plate. The selection of the two of the four bores 11 depends on the desired position of the workpiece.

In its other half of the base plate 1 the base plate 1 forms a wide T-groove 10 which extends parallel to the shorter edge of the top of the base plate 1 and is open at the top.

The transverse sliding element 2 fits into the T-groove 10 of the base plate 1. The base of the transverse sliding elements 2 forms a T-nut 21 which is the counterpart to the T-groove 10 of the base plate 1. In this way the transverse sliding element 2 can be displaced in a direction parallel to the shorter edge of the base plate 1. The displacement distance is greater than the distance between holes of the perforated screen plate of the machine table. No stops are provided at the end of the displacement path and, the transverse sliding element 2 can be inserted into or taken out of its guide on either side.

The upper portion of the transverse sliding element 2 also forms a T-groove 20 having a longitudinal axis which is perpendicular to the longitudinal axis of the T-groove 10 of the base plate 1 and is open toward the top. In addition, the transverse sliding element 2 has a step, extending parallel to the T-groove 20, in the upper part on both sides of the transverse sliding element 2.

A longitudinal sliding element 3 is the counterpart to the T-groove 20 of the transverse sliding element 2. The longitudinal sliding element 3 has a base in the shape of a T-nut 31 which fits into the T-groove 20 of the transverse sliding element 2. In this way the longitudinal sliding element 3 can be displaced along this guide groove parallel to the longer edge of the base plate 1. Stops for the longitudinal sliding element 3 are formed on both sides of the displacement path by the projection 10' of the base plate 1. The displacement path of the longitudinal sliding element 3, and the shorter distance between the bores 11 are equal to or greater than the distance between two adjoining screen holes of the perforated screen plate of the machine table.

A cylinder-shaped bolt body 32 is positioned on the base of the longitudinal sliding element 3. An outer surface of the cylinder shaped bolt body 32 has an arresting thread 33 extending from its center as far as the upper end of the longitudinal sliding element 3. The bolt body 32 has a centered blind bore 34, which is open at the top, and has an inner thread 34'.

An intermediate plate 4 with a rectangular-shaped layout is provided as a further building block component. In the assembled state the intermediate plate 4 rests on the base plate 1. The intermediate plate 4 has an approximately centered cylindrical through bore 42 which has a slightly larger diameter than the bolt body 32 of the longitudinal sliding element 3. The longitudinal sliding element 3 is pushed through the cylindrical through bore 42 of the intermediate plate 4 in the assembled state. The arresting thread 33 of the bolt body 32 projects past the intermediate plate 4.

The intermediate plate 4 has a U-shaped guide groove 41 on its underside, which forms the counterpart to the step 22 of the transverse sliding element 2. In the assembled state the guide groove 41 accomodates the step 22 and in this way constitutes a further guide which permits the mutual longitudinal displacement of the longitudinal sliding element 3 and the intermediate plate 4. The U-shaped guide groove 41 is closed off at one end by a stop 41'.

The intermediate plate 4 has on each side of the cylindrical through bore 42, penetrating fastening bores 43, 44 which have interior threads 43', 44'. The fastening bores 43, 44 can be disposed in the same plane. However, as in the embodiment shown in FIGS. 1–3 the intermediate plate 4 can have a shoulder 45 on its top side on one side of the cylindrical through bore 42 in which there is formed the fastening bore 44. The two fastening bores 43, 44 can have the same or different diameters and can be countersunk. The fastening holes 43, 44 take over the function of the bores in the perforated screen plate of the machine table, and are used as screw holes for fastening the clamping elements with which the workpiece is fastened in a desired position. In contrast to the screen holes of the machine table, the position of these fastening bores 43, 44 can be moved with the aid of the transverse and longitudinal sliding elements 2, 3, and in this way the fastening bores 43, 44 can be placed in an arbitrary position between the holes of the screen plate.

The last building block element of the embodiment shown in FIGS. 1–3 is an arresting nut 5 with a hexagonal exterior 52. The arresting nut 5 has an interior thread 51 which is the counterpart to the exterior thread 33 of the longitudinal sliding element 3. In an assembled state the arresting nut 5 is screwed on the longitudinal sliding element 3 which projects beyond the intermediate plate 4 and in this way secures the intermediate plate 4 to the base plate 1. The transverse sliding element 2 is simultaneously lifted and provides the counterpressure for the intermediate plate 4 by being pressed against the underside of the projection 10' of the base plate 1. In this way the building block elements 1, 2, 3, 4 of the adapter for use with clamping devices for clamping workpieces on perforated screen plates, are clamped against each other and are fixed in relation to the base plate 1. When the single arresting nut 5 is tightened, neither a transverse nor a longitudinal displacement is possible.

It has been shown in the description of the above mentioned embodiment that individual building block elements are connected to each other by T-groove and T-nut connections. In these connections it is immaterial on which one of two connected building block elements the T-groove is formed and on which one the T-nut is formed.

Thus, in one embodiment according to this invention the transverse sliding element 2 has a T-nut on its top and the longitudinal sliding element 3 forms a T-groove. In this embodiment, step 22, which in the previously discussed embodiment, is inserted into the U-groove 41 of the intermediate plate 4 fits in a frictionally connected manner, is not required on the top of the transverse sliding element 2. In this embodiment the U-groove 41 of the intermediate plate 4 encloses the bolt body 32 and thus also the T-nut of the transverse sliding element 2. In this way longitudinal movement of the intermediate plate 4 and the longitudinal sliding element 2 is possible.

The structure of the adapter can be varied in a simple manner. For example, in place of the intermediate plate 4, another building block element in the form of a perforated screen plate can be fastened to the transverse sliding element 2. This perforated screen plate can have the same or different distances between the holes of the perforated screen plate than the perforated screen plate of the machine table. The workpiece to be treated is then fastened on this perforated screen plate with the required clamping elements.

In another embodiment to this invention a composite drawbar of a block clamping strap is directly mounted on the transverse sliding element 2 and in this way is used, together with the base plate 1, for clamping workpieces. In this case the drawbar assumes the function of the longitudinal sliding element 3 and the block clamping strap assumes the function of the additional building block element, namely that of the intermediate plate 4.

Workpieces are not only clamped in the vertical direction, as described up to now. Often horizontal clamping is required. This is made possible by the embodiment according to this invention illustrated in FIGS. 4 and 5.

The adapter shown has the same base plate 1 as the embodiment described in FIGS. 1–3. The lower portion of the transverse sliding element 2' also has the same shape. In this embodiment as shown in FIGS. 4 and 5 the upper portion has a T-nut 20' or a T-comb and the longitudinal sliding element 3' forms the corresponding T-groove 31. The longitudinal sliding element 3' has the shape of the bolt body 32, the upper end of which is shaped into a T-nut 35. The intermediate plate 4' has a rectangular layout, the same as the intermediate plate 4 illustrated in FIGS. 1 and 2, and a cylindrical through bore 42 for receiving the bolt body 32. In the assembled state the T-nut 35 of the longitudinal sliding element 3' projects beyond the intermediate plate 4'.

A U-groove 41' is located on the underside of the intermediate plate 4' and encloses the T-nut 20' of the transverse sliding element 2' assuring mutual longitudinal displacement of the longitudinal sliding element 3' and the intermediate plate 4'. The U-groove 41' is closed off at both ends by stops 43 which limit the longitudinal displacement. At one location the intermediate plate 4' has a penetrating bore with an interior thread 44. At an appropriate location, the bolt body 32 of the longitudinal sliding element 3' has a cutout 36, so that these two building block elements can easily be fixed with respect to each other by a laterally inserted screw.

An upper surface of the intermediate plate 4' is provided with slightly raised parts 45 on its long sides, or in the direction of the longitudinal displacement.

A coupling element 6 is provided as a further building block element. It is formed by a bolt body 62 having a base which form a T-groove 60. In the assembled state, this T-groove 60 receives the T-nut 35 of the longitudinal sliding element 3'. At its upper end the bolt body 63 has a bore 62 with an interior thread and the bolt body 62 has a recess 64 on one side.

A parallelepiped-like horizontal adapter element 7 is a further building block element. It has a through bore 71, the diameter of which in a lower area corresponds to the exterior diameter of the bolt body 62 of the coupling element 6. In the upper area a diameter corresponds to the exterior diameter of a screw 8', which is described further below. The horizontal adapter element 7, the same as does as the intermediate plate 4', forms on its underside a U-groove 72 which is at least as wide as the upper T-nut 35 of the longitudinal sliding element 3'. A penetrating bore 73 with an interior thread is provided on one side of the horizontal adapter element 7.

In the assembled state the horizontal adapter element 7 rests on the intermediate plate 4' and encloses the bolt body 62 of the coupling element 6. The horizontal adapter element 7 and the coupling element 6 are fixed with respect to each other by a screw which is inserted into the recess 64 and extends through the lateral threaded hole 73.

A frictional connection is provided by the screw 8. In the assembled state this screw 8 penetrates through the bore 71 of the horizontal adapter element 7 and engages the interior thread of the bore 63 of the coupling element 6. The horizontal adapter element 7 and the intermediate plate 4' are pressed on the base plate 1 and the transverse sliding element 2' is simultaneously lifted so that, as in the embodiment shown in FIGS. 1–3, a counterpressure is generated. Thus all mentioned building block elements are now clamped to each other and fixed with respect each other and with respect to the base plate 1.

The horizontal adapter element 7 allows a workpiece to be clamped in the horizontal direction. For this purpose the horizontal adapter element 7 forms a T-groove 70 which is perpendicular to the first T-groove 10 of the base plate 1. Again, a transverse sliding element 2, not illustrated here, and the other building block elements described above are mounted in this T-groove 70. Preferably, the T-groove 70 has the same dimensions as the T-groove 10 of the base plate 1. Because of this it is possible to use the same building block elements for horizontal clamping as for vertical clamping. Thus, the horizontal adapter element 7 makes it possible to change the clamping orientation from vertical to horizontal in a simple manner.

This invention permits a multitude of further variation possibilities. The base plate 1 and the transverse sliding element 2 are always required as basic elements. The upper half of the transverse sliding element 2 must have a guide, such as a T-groove guide, which is rotated by 90° with respect to the T-nut 21. A further building block element, which can be selected depending on the requirements, must have as its base the counterpiece for guiding the transverse element.

In this way it is possible to fasten the adapter on a plate with a T-groove, instead of on a perforated screen plate by means of a fastening element. Here, too, the adapter is used for clamping workpieces in arbitrarily selectable positions.

I claim:

1. In an adapter for use with clamping devices for clamping workpieces on at least one of a perforated screen plate and a perforated screen block, the improvement comprising: a plurality of building block-like elements, comprising a base plate (1) with at least two bores (11) separated by a first distance equal to a second distance between screen holes of the perforated screen plate for fastening the base plate (1) to the perforated screen plate, the base plate (1) forming a first T-groove (10) at a lateral distance from the two bores (11) for receiving a transverse sliding element (2), the transverse sliding element (2) forming a second T-groove (20) perpendicular to the first T-groove (10) for receiving a base 31 of a longitudinal sliding element (3) with the base (31) having a shape of a T-nut, a building block element (4) resting on the base plate (1), and arresting means for securing the building block-like elements with respect to each other by interlocking the building block-like elements and clamping the building block-like elements together.

2. In an adapter in accordance with claim 1, wherein the longitudinal sliding element ( 3 ) forms one side building block-like element which is separate from the clamping device.

3. In an adapter in accordance with claim 2, wherein the longitudinal sliding element (3) forms a bolt body (32), and the base (31) which has a shape of a T-nut is formed as one piece with the bolt body (32), the building block (4) comprises an intermediate plate having a cylindrical through bore (42) corresponding to a first exterior diameter of the bolt body (32), the arresting means secure the base plate (1), the transverse sliding element (3) and the intermediate plate (4) frictionally with respect to each other in various positions.

4. In an adapter in accordance with claim 3, wherein the transverse sliding element (2) has two opposing steps (22) which define the second T-groove (20), the opposing steps (22) form a raised shoulder, and a longitudinally extending U-groove (41) is formed by an underside of the intermediate plate into which the raised shoulder fits in an interlocking manner.

5. In an adapter in accordance with claim 4, wherein at least one stop (41') is positioned at the U-groove (41).

6. In an adapter in accordance with claim 3, wherein an upper end of the bolt body (32) has an arresting thread (33) on which a nut (5) can be screwed.

7. In an adapter in accordance with claim 6, wherein the longitudinal sliding element (3) forms a centered and threaded blind bore (34) in the bolt body (32) for fastening the clamping device.

8. In an adapter in accordance with claim 3, wherein the arresting means comprise a screw (8), the bolt body (32) of the longitudinal sliding element (3') has a sliding element T-nut (35) on a first upper end of the longitudinal sliding element (3), a coupling element (6) with a coupling element bolt body (62) has a base which forms a T-groove (60) in which the sliding element T-nut (35) of the longitudinal sliding element (3) can be received, a second upper end of the coupling element (6) forms a threaded hole (63) for receiving the screw (8), and an additional building block element rests on the intermediate plate and has a plate through bore (71), a first diameter of a lower area of the plate through bore (71) corresponds to a second exterior diameter of the coupling element bolt body (62) and a second diameter of an upper area of the plate through bore (71) corresponds to a third exterior diameter of the screw (8).

9. In an adapter in accordance with claim 3, wherein an adapter element (7) is fastened to the intermediate plate, the adapter element (7) has a first base wall defining a third T-groove (70) which is perpendicular to a second base wall of the first T-groove (10) of the base plate (1), thereby allowing the workpiece to be horizontally clamped.

10. In an adapter in accordance with claim 9, wherein the adapter element (7) is the additional building block element.

11. In an adapter in accordance with claim 3, wherein the intermediate plate supports the clamping devices and forms fastening bores (43, 44) in which the clamping devices are fastened.

12. In an adapter in accordance with claim 1, wherein the base plate (1) forms at least four bores (11) having central longitudinal axes which define four corners of a rectangle on a top surface of the base plate (1), two long sides of the rectangle are parallel to a first longitudinal axis of the first T-groove (10) and have a long side length approximately equal to a distance separating the screen holes of the perforated screen plate, and two short sides of the rectangle are perpendicular to the first longitudinal axis of the first T-groove (10) and have a short side length equal to approximately at least half the distance separating the screen holes of the perforated screen plate.

13. In an adapter in accordance with claim 12, wherein a first displacement path length of the transverse sliding element (2) within the first T-groove (10) is at least approximately equal to the long side length of one of the long sides of the rectangle, and a second displacement path length of the longitudinal sliding element within the second T-groove (20) of the transverse sliding element (2) corresponds to a length of the second T-groove (20) is at least approximately equal to the short side length of one of the short sides of the rectangle.

14. In an adapter in accordance with claim 8, wherein an adapter element (7) is fastened to the intermediate plate and is the additional building block element.

* * * * *